US008659401B2

(12) United States Patent
Nielsen et al.

(10) Patent No.: US 8,659,401 B2
(45) Date of Patent: *Feb. 25, 2014

(54) SYSTEM AND METHOD FOR CONTROLLING AT LEAST ONE DEVICE

(75) Inventors: Martin Sandal Nielsen, Norre Nebel (DK); Bjarne Ravndal Andreasen, Struer (DK)

(73) Assignee: VKR Holdings A/S (DK)

( * ) Notice: Subject to any disclaimer, the term of this patent is extended or adjusted under 35 U.S.C. 154(b) by 1444 days.

This patent is subject to a terminal disclaimer.

(21) Appl. No.: 11/994,753

(22) PCT Filed: Jul. 3, 2006

(86) PCT No.: PCT/DK2006/000392
§ 371 (c)(1),
(2), (4) Date: Jan. 4, 2008

(87) PCT Pub. No.: WO2007/003197
PCT Pub. Date: Jan. 11, 2007

(65) Prior Publication Data
US 2008/0221718 A1    Sep. 11, 2008

Related U.S. Application Data

(63) Continuation of application No. PCT/DK2005/000465, filed on Jul. 4, 2005.

(51) Int. Cl.
*H04J 3/02*   (2006.01)
*G05B 11/01*  (2006.01)
*H04Q 9/00*   (2006.01)
*G06F 17/00*  (2006.01)

(52) U.S. Cl.
USPC ............... 340/12.5; 340/13.24; 340/12.22

(58) Field of Classification Search
CPC ............ H04J 3/02; G05B 11/01; H04Q 9/00; G06F 17/00
USPC ........ 340/12.5, 13.24, 12.22, 311.1; 370/462, 370/438; 700/12, 22, 110; 455/352; 318/266, 285
See application file for complete search history.

(56) References Cited

U.S. PATENT DOCUMENTS 4,513,284 A * 4/1985 Right ..................... 340/311.2
5,449,987 A * 9/1995 McMillan ................ 318/266
(Continued)

FOREIGN PATENT DOCUMENTS

CN    1454281 A    11/2003
CN    1529837 A    9/2004
(Continued)

OTHER PUBLICATIONS

International Search Report; PCT/DK2006/000392; Sep. 4, 2006.

*Primary Examiner* — Nam V Nguyen
(74) *Attorney, Agent, or Firm* — Cantor Colburn LLP (57) ABSTRACT

System and method for controlling at least one device such as for example an operator for a door, a gate, a window, blinds, shutters, a curtain, an awning or a light source including at least one controllable unit associated with the at least one device and a plurality of nodes for transmitting control signals to the at least one controllable unit. At least one of the plurality of nodes for transmitting control signals are configured for transmitting a command originator, the command originator including an identification of a predetermined type of the node, from which the signal originates.

20 Claims, 3 Drawing Sheets

(56) References Cited

U.S. PATENT DOCUMENTS

| | | | |
|---|---|---|---|
| 5,595,342 A * | 1/1997 | McNair et al. | 236/51 |
| 5,790,065 A * | 8/1998 | Yaroch | 341/173 |
| 6,107,937 A * | 8/2000 | Hamada | 340/4.3 |
| 6,522,078 B1 * | 2/2003 | Okamoto et al. | 315/149 |
| 6,574,234 B1 * | 6/2003 | Myer et al. | 370/462 |
| 7,058,458 B2 * | 6/2006 | Munezane | 700/12 |
| 7,111,320 B1 * | 9/2006 | Novak | 725/139 |
| 7,342,375 B2 * | 3/2008 | Johansen | 318/483 |
| 7,346,016 B2 * | 3/2008 | Nielsen et al. | 370/310 |
| 7,375,673 B2 * | 5/2008 | Spilo | 341/176 |
| 7,446,671 B2 * | 11/2008 | Giannopoulos et al. | 340/12.24 |
| 2003/0145322 A1 | 7/2003 | Song | |
| 2003/0181992 A1 | 9/2003 | Lee et al. | |
| 2005/0046360 A1 | 3/2005 | Courtney et al. | |
| 2005/0216575 A1 * | 9/2005 | Armstrong et al. | 709/223 |

FOREIGN PATENT DOCUMENTS

| | | |
|---|---|---|
| EP | 0 507 365 | 10/1992 |
| EP | 1 091 079 | 4/2001 |
| FR | 2 849 935 | 7/2004 |
| JP | 04-020197 | 1/1992 |
| JP | 2002231465 | 8/2002 |
| WO | 02/31304 | 4/2002 |
| WO | 03/007090 | 1/2003 |

* cited by examiner

SYSTEM AND METHOD FOR CONTROLLING AT LEAST ONE DEVICE

CROSS REFERENCE TO RELATED APPLICATION

This application is related to and claims the benefit of International Patent Application No. PCT/DK2005/000465 filed on 4 Jul. 2005 designating the United States which said International Application is herein incorporated by reference in its entirety.

TECHNICAL FIELD OF THE INVENTION

The invention relates to a system and a method for controlling at least one device, said system comprising at least a controllable unit associated with said at least one device and a plurality of nodes for transmitting control signals to said at least one controllable unit.

BRIEF DISCUSSION OF RELATED ART

In control systems, wherein control points, sensors and actuators are included, such as for example home automation systems, certain priority rules may be established, e.g. in order to ensure that commands having a higher priority than other ones will be executed immediately and further to ensure that such commands may prevent lower-prioritized commands from being executed e.g. during a certain time period.

Normally, such priority levels are arranged in a decreasing manner, for example in the order: user security, product or environment protection, user manual control, automatic comfort control. Thus, if for example a command signal is sent from a rain sensor to a window operator, signalling that an open window must be closed due to rainfall, i.e. at a environment control level, a subsequent command signal from a temperature sensor indicating a high temperature that would e.g. cause the window to be opened in order to ventilate, i.e. at an automatic comfort control level, the command signal sent from the temperature sensor will due to the priority be prevented from causing an action for as long as the rain sensor signal has effect. Most home automation technologies are designed in such a manner that when a certain priority level is activated, all the lower levels are locked.

This may, however, create confusion and dissatisfaction with the control system at the user, since he/she may not understand why a command signal sent from, e.g. a remote control is not executed. For example, a terrace awning may be locked in a top position since the wind is blowing and the wind speed is above a predefined level, e.g. signalled by a signal from a wind speed sensor in the system. However, if the user tries with his/her remote control to control the awning to go down, e.g. because the sun is shining, the user cannot understand why the awning is not going down. The user may thus think that the remote control is at fault, that the awning is faulty or that the system as a whole is malfunctioning.

Further, a control system may be configured for blocking certain actuations in certain circumstances, which may be preferable normally, but which may be in contradiction to user requirements at certain times. For example, a system may be set up to prevent the blinds from being raised when the sun is shining e.g. in order to protect the furniture, carpet etc. from the sun. In certain cases the user may wish to overrule such a setting and raise the blinds with a remote control.

BRIEF SUMMARY OF THE INVENTION

Thus, the invention provides a control system and a method of controlling such a system that provide an improvement in relation to the prior art systems.

Further, the invention provides such a control system and such a method of controlling such a system by means of which it is avoided that the user may be confused in such situations.

The invention also provides such a control system and such a method of controlling such a system by means of which it is made possible to improve the management capability of a control system, e.g. a home automation system, for example by allowing that the execution of commands from a specific type of node may be prevented.

The invention relates to a system for controlling at least one device such as for example an operator for a door, a gate, a window, blinds, shutters, a curtain, an awning or a light source, said system comprising at least a controllable unit associated with said at least one device and a plurality of nodes for transmitting control signals to said at least one controllable unit, wherein at least one of said plurality of nodes for transmitting control signals are configured for transmitting a command originator, said command originator comprising an identification of a predetermined type of the node, from which the signal originates.

Hereby, it is achieved that if a command signal sent from another node in the system, e.g. a remote control, to the controllable unit is rejected because a previous command/control signal has locked the controllable unit, the controllable unit may inform said another node of the cause.

If the example given above is considered, where a terrace awning are locked in a top position since the wind is blowing and the wind speed is above a predefined level, e.g. signalled by a signal from a wind speed sensor in the system, and where the user tries with his/her remote control to control the awning to go down, e.g. because the sun is shining, the user can be informed from the awning in a response signal, for example an acknowledge signal comprising a non-execution status and an indication that the command cannot be executed since a wind sensor has blocked for movement of the awning.

It will be understood that the command signal may be transmitted from another type of controller than a user-operated remote control, but that also in such cases the information regarding the type of e.g. the blocking node or sensor will provide useful information to the controller.

Preferably, said at least one controllable unit may be configured for storing information relating to said command originator, i.e. relating to a predetermined type of the node, from which the signal originates.

Preferably, said at least one controllable unit may be configured for transmitting information relating to said command originator in response to a received control signal, the execution of which is denied in consequence of a previous control signal, to which the command originator was related.

Hereby, it is achieved that the user may be informed of the cause of the non-execution of the control signal that has been transmitted from e.g. a remote control.

According to a further advantageous embodiment, said node, from which a denied control signal was transmitted, may comprise means for indicating information relating to a command originator, e.g. a visual signal corresponding to the type of the node.

Hereby, the user may be informed in a straightforward and intelligible manner of the cause, for example by an icon or symbol that emerges on e.g. the display of the remote control, for example a wind sensor pictogram that furthermore may flash or in another manner draw the attention of the user.

Advantageously, said at least one controllable unit may be configured for storing information relating to a command originator received with a control signal, and said at least one controllable unit may further be configured for rejecting a control signal originating from a node having a corresponding command originator.

Hereby, it is made possible to have the controllable unit in a selectable manner reject certain control signals instead of having all control signals rejected when an action is blocked. It will for example be possible to reject signals coming from a wind sensor, whereas a signal coming from a sun sensor may lead to the execution of an action.

Preferably, said at least one controllable unit may comprise means for storing and handling command originator information.

Advantageously, said means for storing and handling command originator information may comprise timer functions means, whereby it is achieved that blockings may be made time-dependable.

According to a further embodiment, as specified in claim 8, said system may be configured for deleting or temporarily neutralizing stored information relating to a command originator in response to the receipt of a signal comprising a predetermined command originator.

Hereby, it is made possible to overrule certain entries that have been made at said controllable unit.

For example, with reference to the example given above, where a system may be set up to prevent e.g. the blinds from being raised when the sun is shining e.g. in order to protect the furniture, carpet etc. from the sun, such a situation may be overruled by the user, if it is desired. In accordance with this embodiment, the user may send a signal to e.g. an awning or a blind, informing the system that a signal received from a sun sensor must be blocked, thus allowing the user to raise the blinds or retract the awning as desired, even though the sun is shining. For example, a remote control may be equipped with e.g. a "sun sensor-blocking" function key or the like.

Advantageously, said predetermined command originator may be an emergency command originator.

Hereby, it is achieved that the disable-entry or -entries at the controllable node may be neutralized, either permanently, in which case they will be deleted, or for a specified time period in particular emergency situations, where after the activation specified by the command signal will be allowed to be executed, e.g. the opening of a window as an escape way.

It is noted that, preferably, a command signal comprising an emergency command originator can not be disabled by other command signals. Furthermore, it is noted that a command signal comprising an emergency command originator may preferably be transmitted from any unit or node in general.

The invention also relates to a method of operating a device such as for example an operator for a door, a gate, a window, blinds, shutters, a curtain, an awning or a light source, which device is associated with a controllable unit, said controllable unit being designed for receiving control signals from a plurality of nodes in a control system and activating said device in accordance with said control signals, whereby a command originator is assigned to a control signal, said command originator comprising an identification of a predetermined type of the node, from which the signal originates.

Hereby, it is achieved that if a command signal sent from another node in the system, e.g. a remote control, to the controllable unit is denied or rejected, e.g. the command signal does not lead to an actuation because a previous command signal has locked the controllable unit, the controllable unit may inform said another node of the cause.

Advantageously, said at least one controllable unit may be configured for storing information relating to said command originator, i.e. relating to a predetermined type of the node, from which the signal originates.

Preferably, said at least one controllable unit may transmit information relating to said command originator in response to a received control signal, the execution of which is denied in consequence of a previous control signal, to which the command originator was related.

Hereby, it is achieved that the user may be informed of the cause of the non-execution of the control signal that has been transmitted from e.g. a remote control. According to a further advantageous embodiment, information relating to a command originator, e.g. a visual signal corresponding to the type of the node, may be indicated by the node, from which a denied control signal was transmitted.

Hereby the user may be informed in a straightforward and intelligible manner of the cause, for example by an icon or a symbol that emerges on e.g. the display of the remote control, for example a wind sensor pictogram that furthermore may flash or in another manner draw the attention of the user.

Advantageously, information relating to a command originator received with a control signal may be stored by said at least one controllable unit, and said at least one controllable unit may further reject a control signal originating from a node having a corresponding command originator.

Hereby, it is made possible to have the controllable unit in a selectable manner reject certain control signals instead of having all control signals rejected when an action is blocked. It will for example be possible to reject signals coming from a wind sensor, whereas a signal coming from a sun sensor may be executed.

Preferably, said at least one controllable unit may comprise means for storing and handling command originator information.

According to a further advantageous embodiment, said stored command originator information may be rejected at the lapse of a time period, whereby it is achieved that blockings may made time-dependable.

According to a further embodiment, as specified in claim 17, stored information relating to a command originator may be deleted or temporarily neutralized in response to the receipt of a signal comprising a predetermined command originator.

Hereby, it is made possible to overrule certain entries that have been made at said controllable unit.

For example, with reference to the example given above, where a system may be set up to prevent e.g. the blinds from being raised when the sun is shining e.g. in order to protect the furniture, carpet etc. from the sun, such a situation may be overruled by the user, if it is desired. In accordance with this embodiment, the user may send a signal to e.g. an awning or a blind, informing the system that a signal received from a sun sensor must be blocked, thus allowing the user to raise the blinds or retract the awning as desired, even though the sun is shining. For example, a remote control may be equipped with e.g. a "sun sensor-blocking" function key or the like.

Advantageously, said predetermined command originator may be an emergency command originator.

Hereby, it is achieved that the disable-entry or -entries at the controllable node may be neutralized, either permanently, in which case they will be deleted, or for a specified time period in particular emergency situations, where after the activation specified by the command signal will be allowed to be executed, e.g. the opening of a window as an escape way.

BRIEF DESCRIPTION OF THE FIGURES

The invention will be explained in further detail below with reference to the figures of which

DETAILED DESCRIPTION OF THE INVENTION

Figure 1:
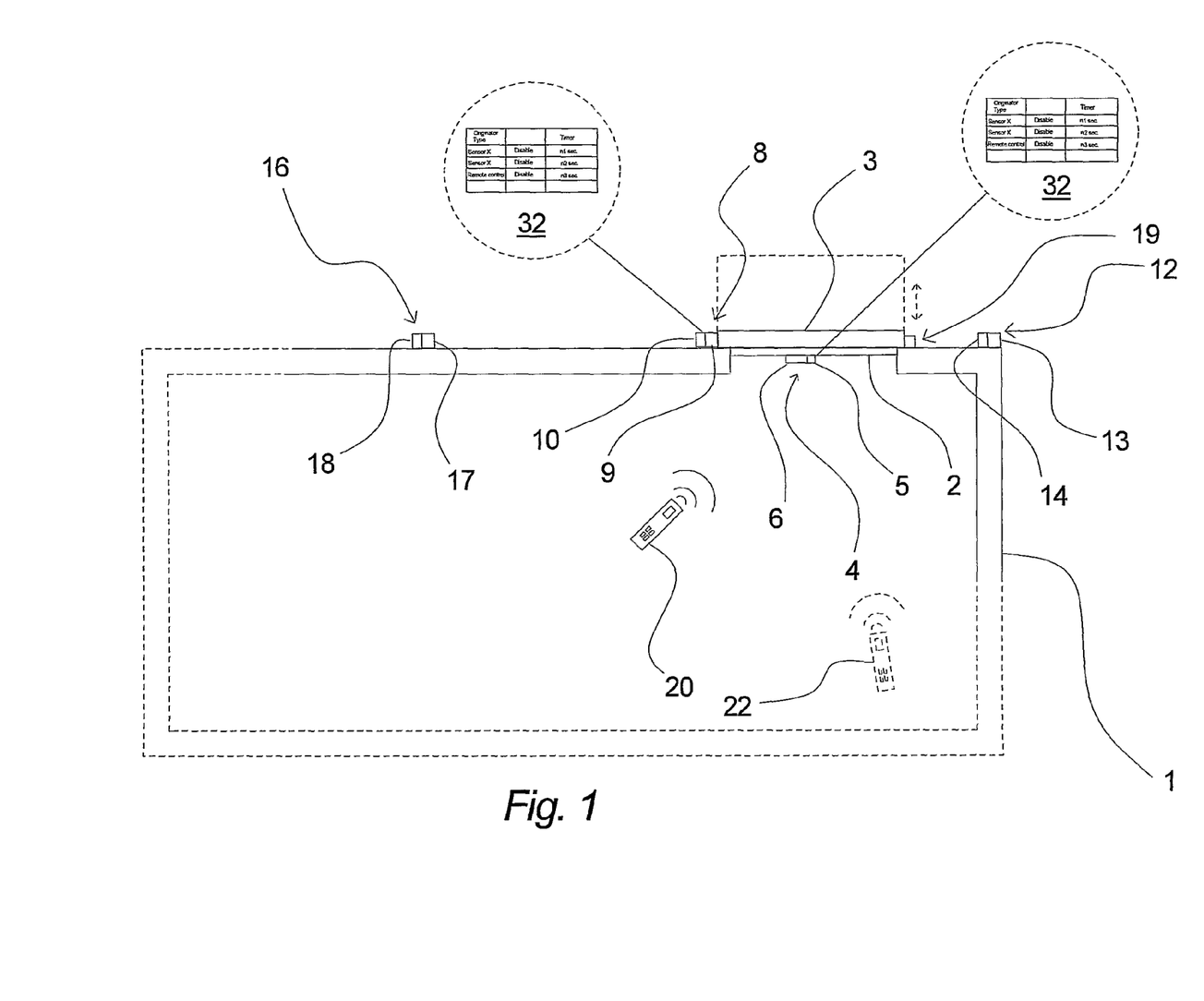
FIG. 1 shows in a schematic manner an example of a control system in accordance with the invention.

An example of a control system according to an embodiment of the invention, e.g. a home automation system or part thereof, is illustrated in FIG. 1. Here, a building, a house or the like 1 is illustrated in a schematic manner, showing in detail only a part of the house or a room where a window 2 is located. The window 2 may be provided with a window actuator, operator or opener 4, which may comprise a drive mechanism generally designated 6 and a controllable node 5, e.g. a node comprising a radiofrequency receiver and control means. Further, the window 2 may be provided with an awning 3, which is retractable as indicated, operated by means of an operator 8. This operator 8 may comprise a drive engine generally designated 9 and a controllable node 10, e.g. a node comprising a radiofrequency receiver and control means.

The control system may also comprise one or more sensors such as e.g. a wind speed sensor 12, a sunlight sensor 16 and a rain sensor 19. Such sensors may as indicated comprise a sensor part, e.g. an anemometer 13 and a photometer 17, respectively, and a transmitter part, e.g. 14 and 18, respectively, which transmitter parts may e.g. comprise RF-means or may rely on wired transmission. The rain sensor 19 may be integrated with the window 2, but will also comprise a sensor part and a transmitter part (not illustrated). Further sensors or controllers may be provided, also inside the room, for example in the form of a temperature sensor etc.

Further, the control system may comprise one or more remote controls 20 and 22 as shown for operating the controllable devices, e.g. the window opener 4 and the awning 3. These remote controls may be similar, e.g. comprise similar properties, but the may also differ, e.g. have different properties as regards e.g. priority. One, e.g. the remote control 20 may for example be a master control while another, e.g. the remote control 22 may be a slave remote control.

These remote controls 20 and 22 and the sensors 12, 16 and 19 may all transmit control signals to the controllable units, e.g. the controllable nodes 5 and 10, associated with the window 2 and the awning 3, respectively. It will be understood that the terms "control signals" in this respect comprise any signal transmitted from a node such as a sensor or a remote control to a controllable unit, including signals representing measured values etc., and that the controllable unit may or may not react upon such a signal, e.g. in accordance with certain predefined or established rules.

For example, a signal transmitted from the wind sensor 12 to the controllable unit 10 associated with the awning 3 can lock the awning, e.g. maintain the awning 3 in its retracted position, when the wind speed exceeds a predefined level. The command or control signal sent from the wind speed sensor 12 comprises information regarding the type of equipment that has sent the signal, e.g. "wind sensor", and this information is stored in the controllable unit 10 associated with the awning 3. If a control signal is transmitted from e.g. the remote control 20 commanding the awning 3 to roll out, the controllable unit 10 will determine that the command is blocked by a wind sensor and a response signal, e.g. an acknowledgement is sent back to the remote control 20 with the information that the action cannot be executed, caused by a wind sensor.

It is understood that if the system shown in FIG. 1 comprises two or more wind sensors placed at different locations, the controllable unit 10 at the awning would have stored the information that the command signal causing the locking was transmitted from a wind sensor, i.e. the type of control node, and not necessarily the specific wind sensor. The information transmitted to the remote control 20 would also in this example specify that the action was non-executable caused by a wind sensor. Information regarding the particular wind sensor would not provide the user with any useful information.

Further, it is understood that when a control signal comprising command originator information is transmitted to a controllable node, which signal causes the controllable node to e.g. perform an action and lock the device hereafter, a timer function may be involved as well. For example, if a signal from the rain sensor 19 causes the window operator 4 to close and lock, e.g. controlled by the node 5, which also stores the information that a rain sensor has caused this action, a timer may be set up to maintain the locking for a period of e.g. 10 minutes after the occurrence of a rain sensor signal to the node 5.

Further, command originator information, i.e. the information regarding the type of equipment, from which a control signal has been sent, may also be used for deciding whether or not a command may be executed.

For example, when a control signal from e.g. the rain sensor 19 is received at the controllable node 10, whereafter e.g. the awning is locked in a retracted position, it may be registered that the disablement is related to a certain type of node, e.g. sensor or remote control. Further, this may as explained above, also be in dependence on a timer. It will also be understood that more than one signal giving such information may be transmitted to the controllable node, each giving rise to a set-up as explained.

Figure 2A:
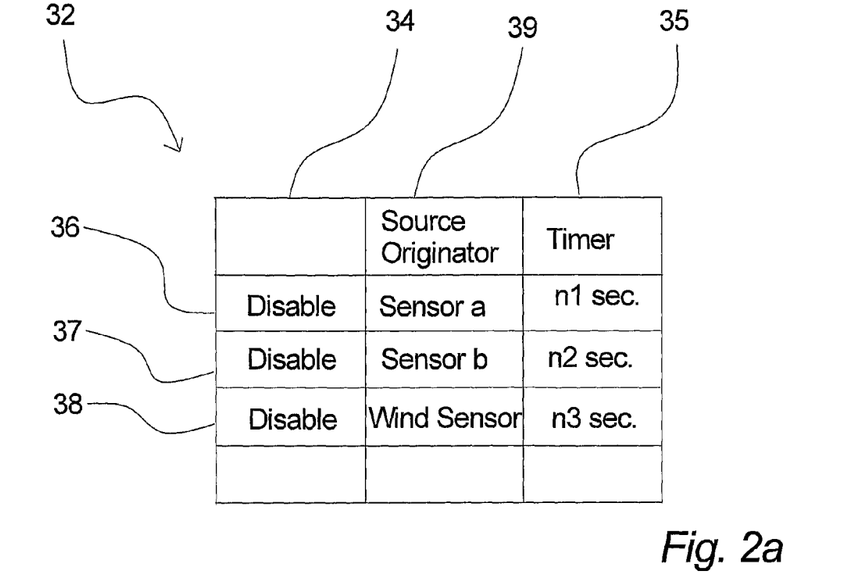
FIGS. 2a-b show examples of a priority and command management table in accordance with an embodiment of the invention.

Thus, the reception of such a signal at a node can lead to an entry in e.g. a table 32 as shown in FIG. 2a, wherein each row 36, 37, 38 corresponds to an incoming signal by means of which an action has been disabled as indicated in the column 34. For all entries in the table the node will have a record of the originator, from which each of the signals have been transmitted, e.g. the "source originator" as indicated in the column 39, e.g. sensor a, sensor b and wind sensor. It will be understood that other types of controllers may be involved as well. Further, for each of these, a timer function 35 may be active, e.g. indicating for how long the blocking is active.

Figure 2B:
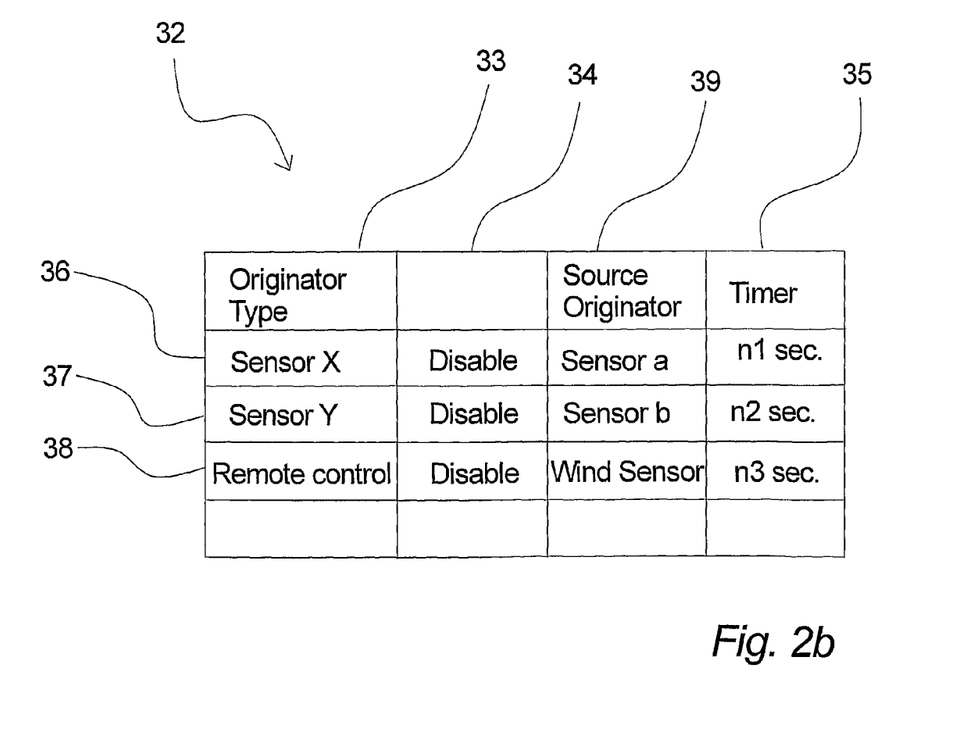

Furthermore, as shown in FIG. 2b, which corresponds to FIG. 2a, but where a column 33 has been added, the table 32 may also comprise an indication of the type of equipment, from which a command signal cannot be executed. For example, the "sensor X" may be a sun sensor, "sensor Y" may be a rain sensor, and the "remote control" may be a master remote control. It will be understood that other types of controllers may be involved as well.

Thus, in the example shown in FIG. 2b, if a control signal from a remote control is received at the node, e.g. in order to roll-out an awning, this control signal will be blocked due to the entry 38 and a signal will be transmitted back to the remote control, indicating to the user that the actuation is blocked, caused by a wind sensor, e.g. due to the wind condition.

Further, the node may also have a record of the originator for other control signals that do not lead to a blocking but only relates to e.g. an activation of a device.

As indicated in FIG. 1, such a table 32 may be allocated to each of the controllable nodes, e.g. 5 and 10 in the system.

When a control signal is received at such a node, the command originator is identified. If the control signal is of a nature that leads to a locking of activation, the command originator is stored as initially explained. If the control signal initiates a locking of activation for certain types of equipment, i.e. certain originator types, an entry is made in the column 33 in the table 32 and a timer function 35 is set up. Further, it is noted that if the control signal involves a function e.g. an activation that has to take place, this is evaluated in view of the content of the table, e.g. in order to examine if the function is prohibited by the content of the table. If the function is excluded from being executed, a response signal to that effect may as previously explained be sent e.g. back to the node in question.

Each time a control signal is received at the controllable node, the table 32 is updated, e.g. if a timer function has lapsed, the entry is deleted from the table, before the control signal is evaluated in regard to the content of the table.

It will be understood that the table for practical reasons will be limited as regards the number of entries. If a control signal is received that has a content requiring an entry to be made when the table is full, different solutions are possible. The simplest solution is to reject the control signal. However, other manners of handling such a situation are possible. For example, it may be decided that the entry with the smallest remaining timer value may be excluded etc.

According to a further embodiment, it may be possible to revoke or neutralize a locking of a node, e.g. a device associated with the node. If an example is considered, where a system may be set up to prevent e.g. the blinds from being raised when the sun is shining e.g. in order to protect the furniture, carpet etc. from the sun, such a situation may be overruled by the user, if it is desired. In accordance with this embodiment, the user may send a signal via a remote master control to e.g. an awning or a blind, informing the system that a signal received from a sun sensor must be blocked, thus allowing the user to raise the blinds or retract the awning as desired, even though the sun is shining. For example, a remote control may be equipped with e.g. a "sun sensor-blocking" function key or the like. Such an overruling may be time dependent, for example having the effect that the entry 38 in the table 32 in FIG. 2b is overruled for a limited time, whereafter it is made active again, unless the original timer function has lapsed (n3 seconds). Further, the overruling may be permanent, meaning that the entry, e.g. the entry 38 in the table 32 in FIG. 2b is deleted from the table.

Other examples of such command signals comprising information having the effect that an already established entry locking for an activation may be overruled, e.g. deleted permanently or neutralized for a predetermined period of time, are possible.

For example, a command signal may be assigned an "emergency" originator, thus effecting that if such a signal is transmitted to a node which is locked, the node will identify the originator as an emergency originator. In such a case, the disable-entry or -entries at the node will be neutralized, either permanently, in which case they will be deleted, or for a specified time period, and the activation specified by the command signal will be allowed to be executed. As indicated, such an activation may be related to safety aspects, for example in case of fire, where it is important that it will be possible to open e.g. a window in spite of the fact that it is raining heavily, which normally will give rise to an entry from a rain sensor, disabling the actuation of the window opener. Thus, a remote control may be provided with a special emergency key, which, when manipulated will have the effect of overruling any entries locking the activation at the node(s).

Preferably, a command signal comprising a command originator of the emergency-type can not be disabled by any other command signals, e.g. other entries already present in the table or command signals being received afterwards. Furthermore, it is noted that a command signal comprising an emergency command originator may preferably be transmitted from any unit or node in general.

It will be understood that a command originator system in accordance with the invention may be combined with other handling systems and methods used in control systems, e.g. home automation systems. As an example hereof and in accordance with a further aspect of the invention a priority and level management handling may be included, which will be explained in further detail in the following.

In order to manage priorities, e.g. in a system as illustrated in FIG. 1, the signals from the sensor and control nodes may be provided with priority indications at a number of levels, and when these are received at the controllable nodes, they may be registered and stored in a management table, and an evaluation is performed on the basis of the stored information in the table. On the basis of this evaluation the device associated with the controllable unit is operated, e.g. activated, stalled, stopped, reversed, etc.

Such a management table may be combined with a command originator system as described above into a table, that may take the place of the table 32 indicated in FIG. 1 that is associated with each of the controllable nodes, e.g. the nodes 5 and 10 in this example.

The details of such a table will be further explained with reference to FIG. 3, which shows an example of such a management table 40 for a controllable node or device in a control system.

The priority levels may in accordance with usual practice be arranged in a decreasing way, for example in the following order: Human security, product or environment protection, user manual operation, automatic comfort control. A number of levels may be defined, for example eight levels as shown at 41 in FIG. 3, ranging from the highest level 0 to the lowest level 7, and of these levels the four lowest may be designated to comfort automatic control levels, levels 3 and 2 may be designated to user manual control, while levels 1 and 0 thus are designated for product or environment protection and human security, respectively.

Figure 3:
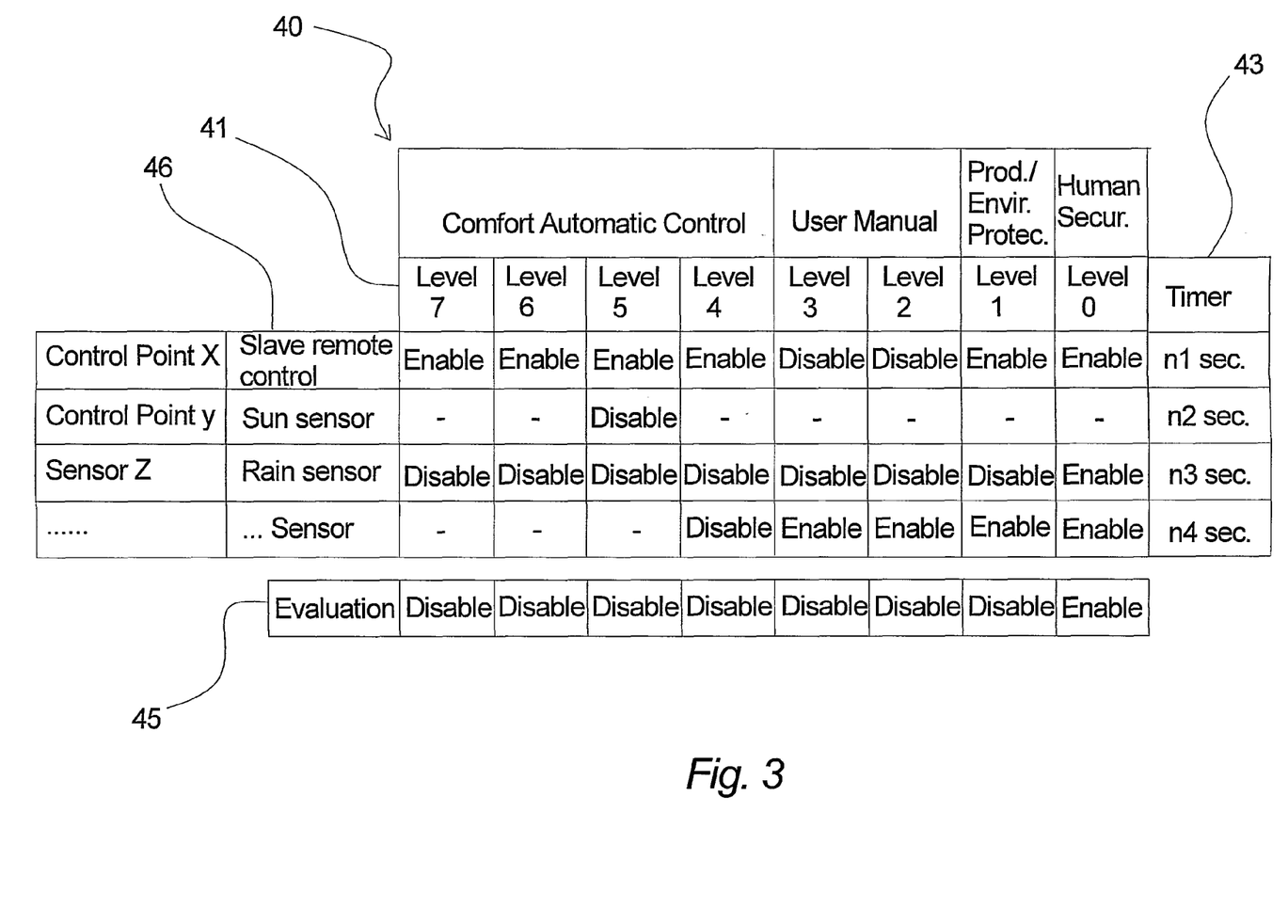
FIG. 3 shows an example of a priority and command level management table in accordance with a further aspect of the invention.

When a signal is received from a node, the content of this signal that relates to priority or priorities on certain command levels leads to the storing of an entry in a management table as shown in FIG. 3. Here, each row corresponds to a signal transmitted from a node to the specific controllable node, and it will be understood that each controllable node comprises such a management table. For each command the table may comprise a priority, e.g. "enable" or "disable" that will lead to a corresponding setting in the table. If the received signal does not specify "enable" or "disable" for a priority level, the evaluation will not be influenced by the signal on this level. Further, the command signal may also indicate a period of time, in which the command must be stored in the table, for example 15 minutes from receipt of the command. Thus, the table will also contain a column 43 indicating a timer operation, e.g. indicating the total time period for the command in question or the remaining time for the command. It is obvious that the controllable nodes comprise timer means for managing the table 40.

When the table is established and when a new command comprising priority indications is received, an entry is made in the table, the table is evaluated and the result is registered in the evaluation row 45. Different rules and algorithms may be used for performing the evaluation. For example as shown in FIG. 3, for each level it is indicated that a command level is disabled when it contains at least one "disable" priority. Another manner of evaluating the table could for instance be to evaluate based on a majority.

An incoming new command signal that contains a command on a level, that is disabled, cannot be executed, whereas a command on a level that is not disabled, can be executed.

As mentioned, the evaluation is performed each time a new command signal comprising priority indications is received, but when a command is removed from the table because the time period has lapsed, the evaluation may also be re-evaluated. Further, it will be understood that the table may be re-evaluated with regular intervals.

When a command is received, which does not comprise priority indications that will lead to an entry, but only require e.g. an activation to be performed, such a command is executed if the level in question is enabled.

As shown in FIG. 3, the table 40 also comprises a column 46 indicating the command originator, e.g. as indicated that the first entry stems from a slave remote control, that the second entry stems from a sun sensor, that the third entry stems from a rain sensor etc. In this manner and as previously explained, information can be transmitted back to a control node in case a command is rejected, which information may serve to inform the user of the reason for the non-execution of the desired activation.

In this manner, the command originator information may also find use in connection with a level and priority management system.

It will be apparent to a person skilled in the art that the method and the system according to the invention may find use in a wide scope of applications, e.g. in home automation systems, and that such systems may comprise a plurality of controllable devices such as windows, doors, blinds, screening, light sources etc. and that such systems similarly may comprise a plurality of nodes for providing control signals, e.g. measurement signals, sensor signals etc. Thus, it will be understood that the example shown in FIG. 1 represents a simple embodiment only.

It will be understood that the invention is not limited to the particular examples described above and illustrated in the drawings but may be modified in numerous manners and used in a variety of applications within the scope of the invention as specified in the claims.

The invention claimed is:

1. System for controlling at least one device, said system comprising:
   at least one controllable unit associated with said at least one device; and
   a plurality of nodes for transmitting control signals to said at least one controllable unit, said plurality of nodes comprising different predetermined types of nodes,
   wherein said at least one controllable unit is configured for receiving control signals from said different predetermined types of nodes,
   wherein at least one of said plurality of nodes for transmitting said control signals is configured for transmitting control signals comprising a command originator to said at least one controllable unit, wherein said command originator of said control signal comprises a node type identification, said node type identification being associated with the predetermined type of node from which the control signal originates, and
   wherein said controllable unit is configured for processing said command signal of said node type identification.

2. System according to claim 1, wherein said at least one controllable unit is configured for storing information relating to said command originator, relating to a predetermined type of the node, from which the signal originates.

3. System according to claim 2, wherein said system is configured for deleting or temporarily neutralizing stored information relating to a command originator in response to the receipt of a signal comprising a predetermined command originator.

4. System according to claim 3, wherein said predetermined command originator is an emergency command originator.

5. System according to claim 1, wherein said at least one controllable unit is configured for transmitting information relating to said command originator in response to a received control signal, an execution of which control signal is denied in consequence of a previously stored control signal, to which the command originator was related.

6. System according to claim 5, wherein said node, from which a denied control signal was transmitted, comprises means for indicating information relating to a command originator.

7. System according to claim 1, wherein said at least one controllable unit is configured for storing information relating to a command originator received with a control signal, and said at least one controllable unit further is configured for rejecting a control signal originating from a node having a corresponding command originator.

8. System according to claim 1, wherein said at least one controllable unit comprises means for storing and handling command originator information.

9. System according to claim 8, wherein said means for storing and handling command originator information comprises timer function means.

10. System according to claim 1, wherein said at least one device is an operator for a door, a gate, a window, blinds, shutters, a curtain, an awning, or a light source.

11. Method of operating a device associated with a controllable unit, said controllable unit being designed for receiving control signals from a plurality of nodes in a control system and activating said device in accordance with said control signals, said plurality of nodes comprising different predetermined types of nodes, wherein a command originator is assigned to a control signal, said command originator comprising a node type identification, said node type identification being associated with the predetermined type of node, from which the control signal originates, wherein said controllable unit is configured for processing said command signal of said node type identification.

12. Method according to claim 11, whereby said at least one controllable unit is configured for storing information relating to said command originator, relating to a predetermined type of the node, from which the signal originates.

13. Method according to claim 12, whereby stored information relating to a command originator is deleted or temporarily neutralized in response to the receipt of a signal comprising a predetermined command originator.

14. Method according to claim 13, whereby said predetermined command originator is an emergency command originator.

15. Method according to claim 11, whereby said at least one controllable unit transmits information relating to said command originator in response to a received control signal, an execution of which is denied in consequence of a previously stored control signal, to which the command originator was related.

16. Method according to claim 11, whereby information relating to a command originator is indicated by the node, from which a denied control signal was transmitted.

17. Method according to claim 11, whereby information relating to a command originator received with a control signal is stored by said at least one controllable unit, and whereby said at least one controllable unit further is configured for rejecting a control signal originating from a node having a corresponding command originator.

18. Method according to claim 11, whereby said at least one controllable unit comprises means for storing and handling command originator information.

19. Method according to claim 18, whereby said stored command originator information is rejected at the lapse of a time period.

20. Method according to claim 11, wherein said device is an operator for a door, a gate, a window, blinds, shutters, a curtain, an awning, or a light source.

\* \* \* \* \*

UNITED STATES PATENT AND TRADEMARK OFFICE
CERTIFICATE OF CORRECTION

| | | |
|---|---|---|
| PATENT NO. | : 8,659,401 B2 | Page 1 of 1 |
| APPLICATION NO. | : 11/994753 | |
| DATED | : February 25, 2014 | |
| INVENTOR(S) | : Martin Sandal Nielsen et al. | |

It is certified that error appears in the above-identified patent and that said Letters Patent is hereby corrected as shown below:

Title page, item (73) Assignee

Replace with the following:

VKR Holding A/S (DK)

Signed and Sealed this
Twenty-fourth Day of June, 2014

Michelle K. Lee
*Deputy Director of the United States Patent and Trademark Office*